(12) United States Patent
Song et al.

(10) Patent No.: US 10,858,173 B2
(45) Date of Patent: Dec. 8, 2020

(54) STRAP GUIDE AND PAIL PACK HAVING THE SAME

(71) Applicant: KISWEL LTD., Busan (KR)

(72) Inventors: Chang Uk Song, Changwon-si (KR); Sang Woo Lee, Changwon-si (KR); Seong Hun Kim, Changwon-si (KR); Byoung Joon Jang, Changwon-si (KR)

(73) Assignee: KISWEL LTD., Busan (KR)

( * ) Notice: Subject to any disclaimer, the term of this patent is extended or adjusted under 35 U.S.C. 154(b) by 16 days.

(21) Appl. No.: 16/288,696

(22) Filed: Feb. 28, 2019

(65) Prior Publication Data
US 2019/0263585 A1 Aug. 29, 2019

(30) Foreign Application Priority Data
Feb. 28, 2018 (KR) .................. 10-2018-0024310

(51) Int. Cl.
| | | |
|---|---|---|
| *B65D 85/04* | (2006.01) | |
| *B65H 49/08* | (2006.01) | |
| *B65H 59/06* | (2006.01) | |
| *B65D 5/46* | (2006.01) | |
| *B23K 9/133* | (2006.01) | |

(52) U.S. Cl.
CPC ............ *B65D 85/04* (2013.01); *B23K 9/1333* (2013.01); *B65D 5/46024* (2013.01); *B65H 49/08* (2013.01); *B65H 59/06* (2013.01)

(58) Field of Classification Search
CPC . B65D 5/441; B65D 5/60; B65D 5/64; B65D 5/5028; B65D 5/46024; B65D 5/12; B65D 25/22; B65D 25/34; B65D 85/02; B65D 85/04; B65D 81/027

USPC ............... 206/389–416; 229/117.24–117.26, 229/117.09, 117.19; 242/128–129, 137, 242/137.1, 160.2, 170–172, 588.3; 220/755–756, 759, 772
See application file for complete search history.

(56) References Cited

U.S. PATENT DOCUMENTS

| | | | | |
|---|---|---|---|---|
| 2,191,291 A | * | 2/1940 | Smith ..................... | B65D 5/445 229/117.16 |
| 2,206,314 A | * | 7/1940 | Werner .............. | B65D 5/46008 229/117.16 |

(Continued)

FOREIGN PATENT DOCUMENTS

| | | |
|---|---|---|
| JP | 2003-072872 A | 3/2003 |
| KR | 10-0853527 B1 | 8/2008 |
| KR | 10-2010-0129468 A | 12/2010 |

*Primary Examiner* — Chun Hoi Cheung
*Assistant Examiner* — Brijesh V. Patel
(74) *Attorney, Agent, or Firm* — Novick, Kim & Lee, PLLC; Jae Youn Kim

(57) ABSTRACT

Provided is a strap guide including: a first module including a first base, a strap boss formed on the first base and including a first slot through which a strap passes, and at least one protrusion accommodation part located at an outer circumferential portion of the strap boss and including a bore; and a second module having a second base, a second slot formed in the second base, and at least one coupling protrusion located at an outer circumferential portion of the second slot and configured to form a pair with the protrusion accommodation part, wherein the first module and the second module are coupled to form an opening having a single closed surface.

7 Claims, 13 Drawing Sheets

(56) References Cited

U.S. PATENT DOCUMENTS

| | | | | |
|---|---|---|---|---|
| 3,279,676 A | * | 10/1966 | Cornish | B65D 5/4608 229/103.11 |
| 3,372,441 A | * | 3/1968 | Fisher | F16B 21/088 16/2.1 |
| 3,932,010 A | * | 1/1976 | Kenworthy | A47B 95/02 16/416 |
| 4,137,602 A | * | 2/1979 | Klumpp, Jr. | B65D 39/04 16/2.1 |
| 4,359,183 A | * | 11/1982 | Aida | B65D 5/46008 206/462 |
| 4,524,902 A | * | 6/1985 | Mortimer | B65D 5/4604 229/117.09 |
| 4,843,675 A | * | 7/1989 | Diamantis | A47H 13/02 16/2.1 |
| 5,031,268 A | * | 7/1991 | McCabe | F16B 21/088 16/2.1 |
| 5,037,027 A | * | 8/1991 | Nichols | B65D 5/0055 206/512 |
| 5,193,701 A | * | 3/1993 | Bush | B42F 15/007 206/425 |
| 5,295,632 A | * | 3/1994 | Zink | B65D 5/0055 229/117.16 |
| 5,462,221 A | * | 10/1995 | Zink | B65D 5/0055 229/117.16 |
| 5,520,477 A | * | 5/1996 | Fink | B65D 11/18 206/509 |
| 5,522,539 A | * | 6/1996 | Bazany | B65D 5/5088 206/523 |
| 5,537,714 A | * | 7/1996 | Lynch, Jr. | B60R 16/0222 16/2.1 |
| 6,223,390 B1 | * | 5/2001 | LoTufo | A47F 7/163 16/110.1 |
| D469,012 S | * | 1/2003 | Lee | B65D 5/0055 D9/434 |
| 6,619,540 B1 | * | 9/2003 | Bazany | B65D 5/0055 220/642 |
| 6,808,105 B2 | * | 10/2004 | Lee | B65D 5/4608 229/117.09 |
| 6,827,217 B2 | * | 12/2004 | Matsuguchi | B65D 85/04 206/395 |
| 7,331,506 B2 | * | 2/2008 | Lai | B65D 5/445 220/770 |
| 7,552,826 B2 | * | 6/2009 | Watanabe | B65D 19/02 206/600 |
| 8,365,912 B2 | * | 2/2013 | Carroscia | B65D 85/04 206/389 |
| 8,967,690 B2 | * | 3/2015 | Cooper | B65D 19/38 280/808 |
| 2004/0007612 A1 | * | 1/2004 | Johanson | B65D 5/4604 229/117.24 |
| 2014/0077023 A1 | * | 3/2014 | Foreman | B65H 49/205 242/588.3 |
| 2014/0215765 A1 | | 8/2014 | Cooper et al. | |
| 2016/0255917 A1 | | 9/2016 | Choi | |
| 2017/0207615 A1 | * | 7/2017 | Trapassi | F16L 5/00 |

* cited by examiner

STRAP GUIDE AND PAIL PACK HAVING THE SAME

CROSS-REFERENCE TO RELATED APPLICATION

This application claims priority to and the benefit of Korean Patent Application No. 2018-0024310, filed on Feb. 28, 2018, the disclosure of which is incorporated herein by reference in its entirety.

BACKGROUND

1. Field of the Invention

The present disclosure relates to a strap guide and a pail pack having the same, and more specifically, to a strap guide which is formed as a module coupling type and thus is easily separated from and coupled to a pail pack, improves a strap supporting force, and prevents damage to a pail pack opening, and a pail pack having the same.

2. Discussion of Related Art

A pail pack is a container configured to spirally stack welding wire and then store the wire, and a weight of the pail pack including the stored wire ranges from 100 kg to 500 kg. A cross-sectional surface of the pail pack has a circular shape or a polygonal shape, and there are a manner of moving the pail pack by forming an engaging portion on a side surface of the pail pack to lift the pail pack, and a manner of moving the pail pack by attaching a pallet on a lower end of the pail pack to move the pail pack using a forklift.

According to a recent technological trend, research on a method of easily performing treatment after the lifespan of a pail pack has ended is actively proceeding, and accordingly, a method of configuring the pail pack to be mainly made of paper is used a lot. When the pail pack is mainly made of paper, since a weight of the pail pack decreases and thus the pail pack is easily moved and stored and is easily recyclable after use, the pail pack is eco-friendly. However, the paper pail pack has various problems such as a strength problem, a moisture resistance problem, and the like due to the paper material.

An opening can be formed in a side portion of the pail pack to allow the pail pack to be easily moved, and in the case of the paper pail pack, the opening of the pail pack is easily worn and damaged when a process such as lifting or moving the pail pack using a strap is repeated over and over. In order to prevent the above, although there is a method of attaching a fiber reinforcement tape or the like to the opening, the method should be performed by hand and a large amount of time is consumed.

(Patent Document 1) Korean Application Patent No. 10-0853527 (Aug. 14, 2008)

SUMMARY OF THE INVENTION

The present disclosure is directed to providing a strap guide which is formed as a module coupling type and thus is easily separated from and coupled to a pail pack, improves a strap supporting force, and prevents damage to a pail pack opening, and a pail pack having the same.

According to an aspect of the present disclosure, there is provided a strap guide including: a first module including a first base, a strap boss formed on the first base and including a first slot through which a strap passes, and at least one protrusion accommodation part located at an outer circumferential portion of the strap boss and including a bore; and a second module having a second base, a second slot formed in the second base, and at least one coupling protrusion located at an outer circumferential portion of the second slot and configured to form a pair with the protrusion accommodation part, wherein the first module and the second module are coupled to form an opening having a single closed surface.

According to an embodiment, an edge of the opening may have a gentle round shape.

According to the embodiment, the second base may include a bent portion having an inclination angle and inclined toward the outside in one side thereof.

According to the embodiment, a diameter of the coupling protrusion may be formed to have a positive tolerance with respect to a diameter of the bore.

According to the embodiment, the strap boss may include curved portions having a gentle curved shape on both side portions and straight portions formed in a direction connecting the curved portions.

According to the embodiment, in a pail pack including two or more accommodation space parts each configured to accommodate the strap guide, the accommodation space part includes a center space part into which the strap boss is fitted, and an upper space part and a lower space part into which the protrusion accommodation part is fitted, and the strap guide is fitted into the accommodation space part.

According to the embodiment, a width of the strap boss may be greater than or equal to a thickness of a paper tube of the pail pack.

According to the embodiment, the first module may be disposed between an inner paper tube and an outer paper tube of the pail pack having the inner paper tube and the outer paper tube, and the second module may pass through the accommodation space part formed in the outer paper tube from the outer side of the outer paper tube to be coupled to the first module.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
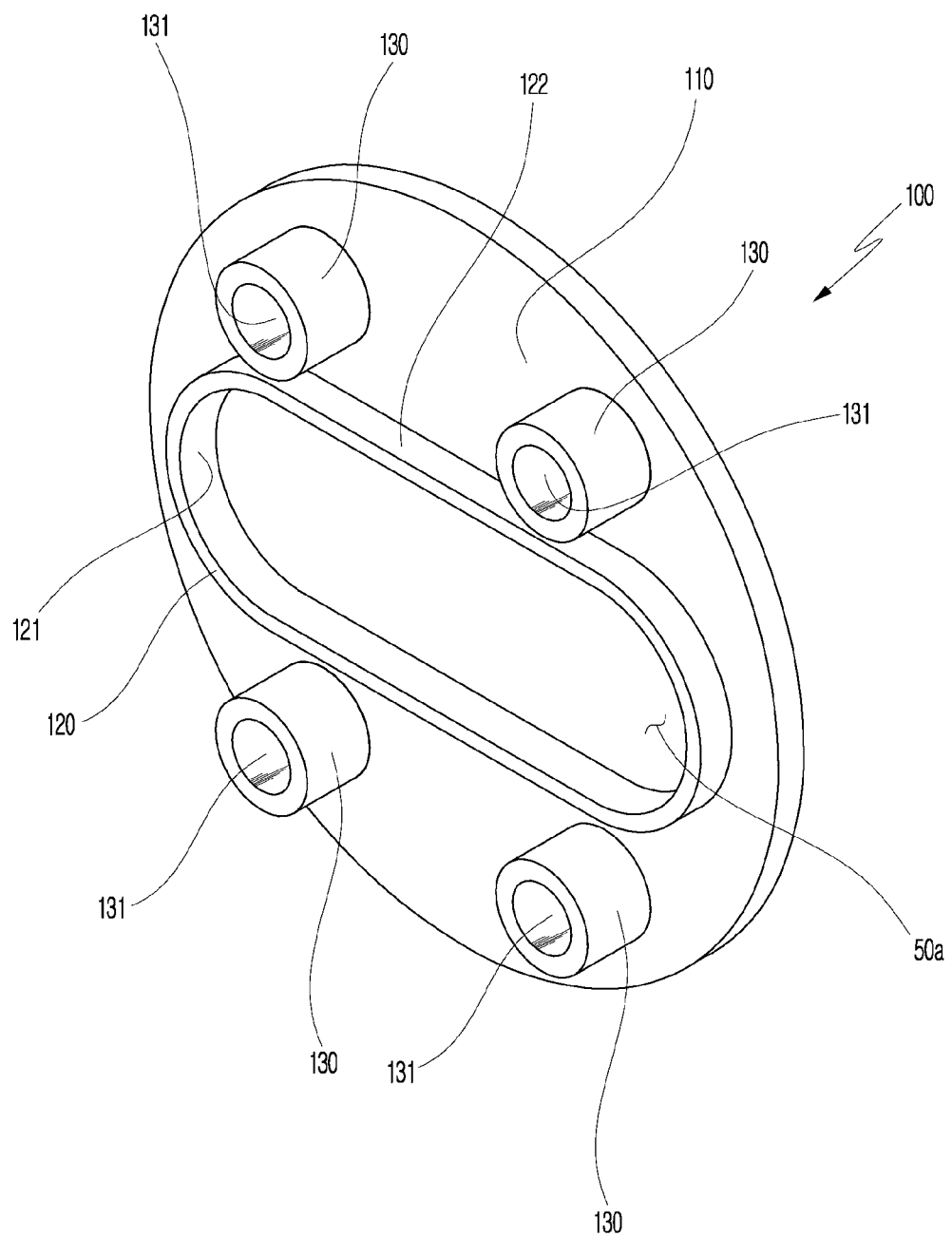
FIG. 1 is a perspective view of a first module according to an embodiment of the present disclosure.

Hereinafter, the present disclosure will be described in detail with reference to the accompanying drawings. However, the present disclosure may be implemented in various forms, and accordingly, the present disclosure is not limited to the following embodiment. Components not related to the description are omitted in the drawings to clearly describe the present disclosure, and the same reference symbols are used for the same or similar components in the description.

In the description, in the case in which predetermined components are described as being "connected" to other components, the above case includes a case in which components are indirectly connected to the other components. Further, in the case in which predetermined components are described as "including" predetermined elements, the above case does not exclude other elements but may further include the other elements unless otherwise defined.

Hereinafter, the embodiment of the present disclosure will be described in detail with reference to the accompanying drawings.

A strap guide 300 of the present disclosure is used as a way in which a first module 100 and a second module 200 are coupled or separated through an accommodation space part 510 of a pail pack 500.

Figure 3A:
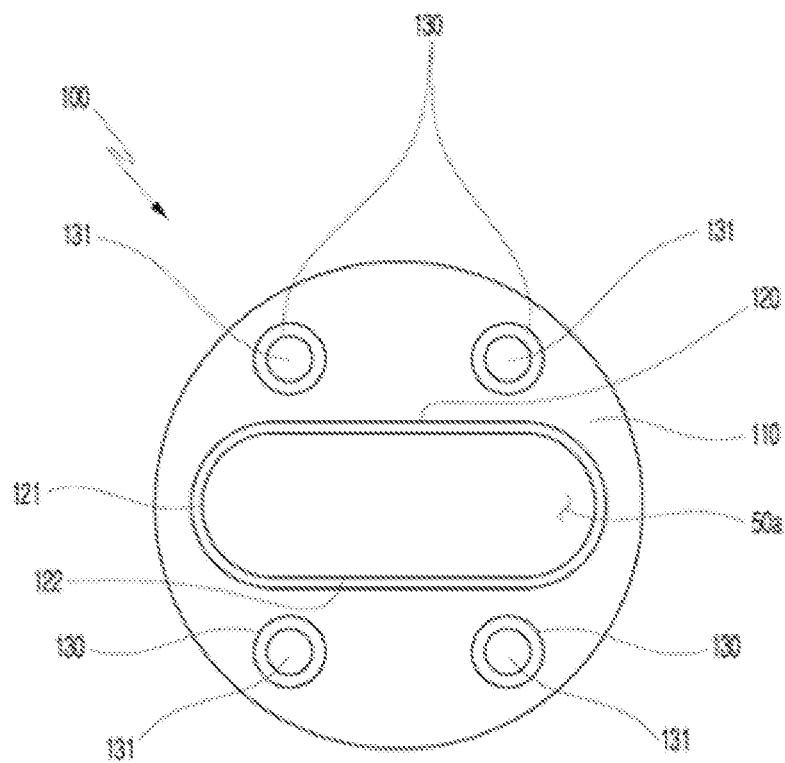
FIGS. 3A and 3B illustrate a front view and a side view of the first module of the present disclosure, respectively.
Figure 3B:
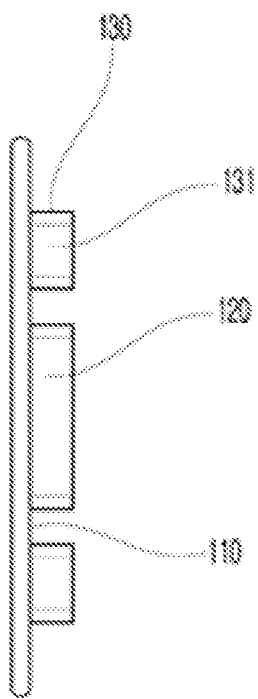

FIG. 1 is a perspective view of the first module 100 according to an embodiment of the present disclosure and FIGS. 3A and 3B are a front view and a side view of the first module 100 according to the embodiment of the present disclosure, respectively.

Referring to FIGS. 1 and 3, the first module 100 includes a first base 110, a strap boss 120, a first slot 50a, and at least one protrusion accommodation part 130. The first base 110 may have a thin plate shape having a circular shape, a polygonal shape, or the like.

The strap boss 120 may be formed to have a predetermined width at a center portion of the first base 110 and includes the first slot 50a surrounded by an inner circumferential surface of the strap boss 120. A strap S may extend to the outside of the pail pack 500 through the first slot 50a.

According to the embodiment, the strap boss 120 may include curved portions 121 having a gentle curved shape on both side portions and straight portions 122 formed in a direction connecting the curved portions 121.

The protrusion accommodation part 130 may be formed in a width direction of the strap boss 120 and may be located at the outer side of the strap boss 120 to be spaced apart from the strap boss 120 at a predetermined interval. The protrusion accommodation part 130 may include a bore 131 configured to accommodate a coupling protrusion 230 of the second module 200, and may be variously formed according to a shape of the coupling protrusion. Preferably, the protrusion accommodation part 130 may have a cylindrical shape to be easily coupled and separated. The protrusion accommodation part 130 may be greater than or equal to one.

According to the embodiment, two pairs of protrusion accommodation parts 130 may be formed above and below the strap boss 120 located at the center portion at predetermined intervals.

Figure 2:
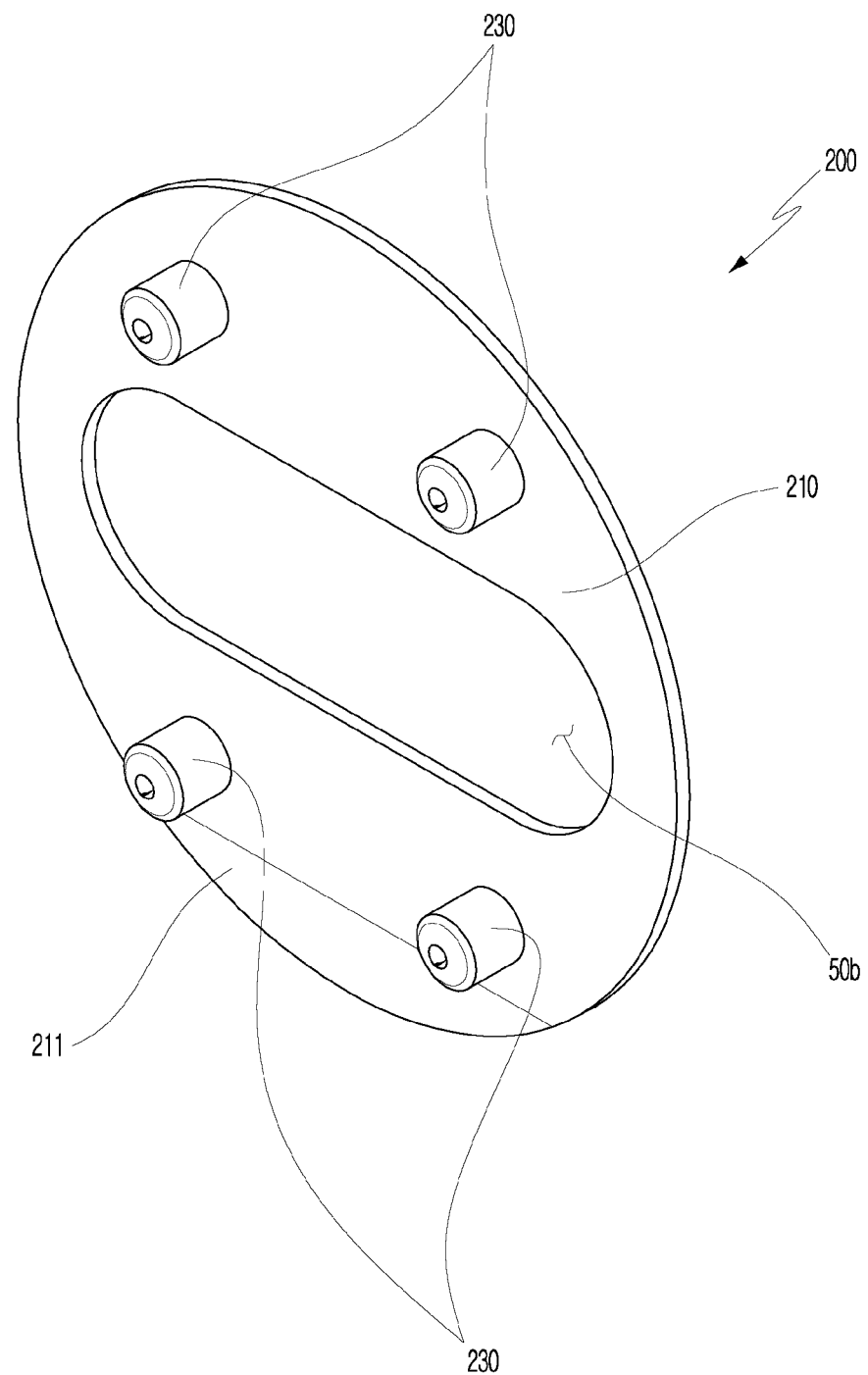
FIG. 2 is a perspective view of a second module according to the embodiment of the present disclosure.
Figure 4A:
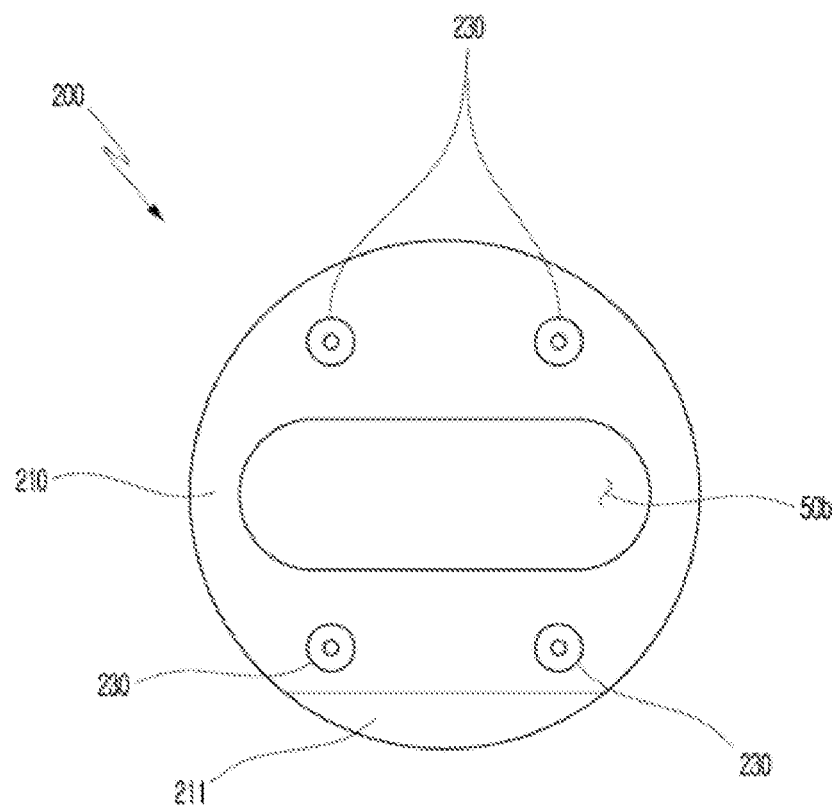
FIGS. 4A and 4B illustrate a front view and a side view of the second module of the present disclosure, respectively.
Figure 4B:
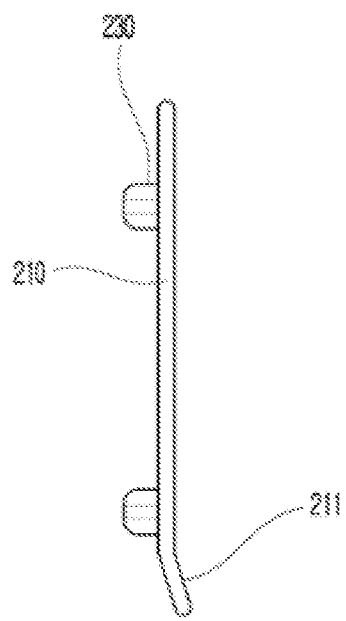
Figure 7:
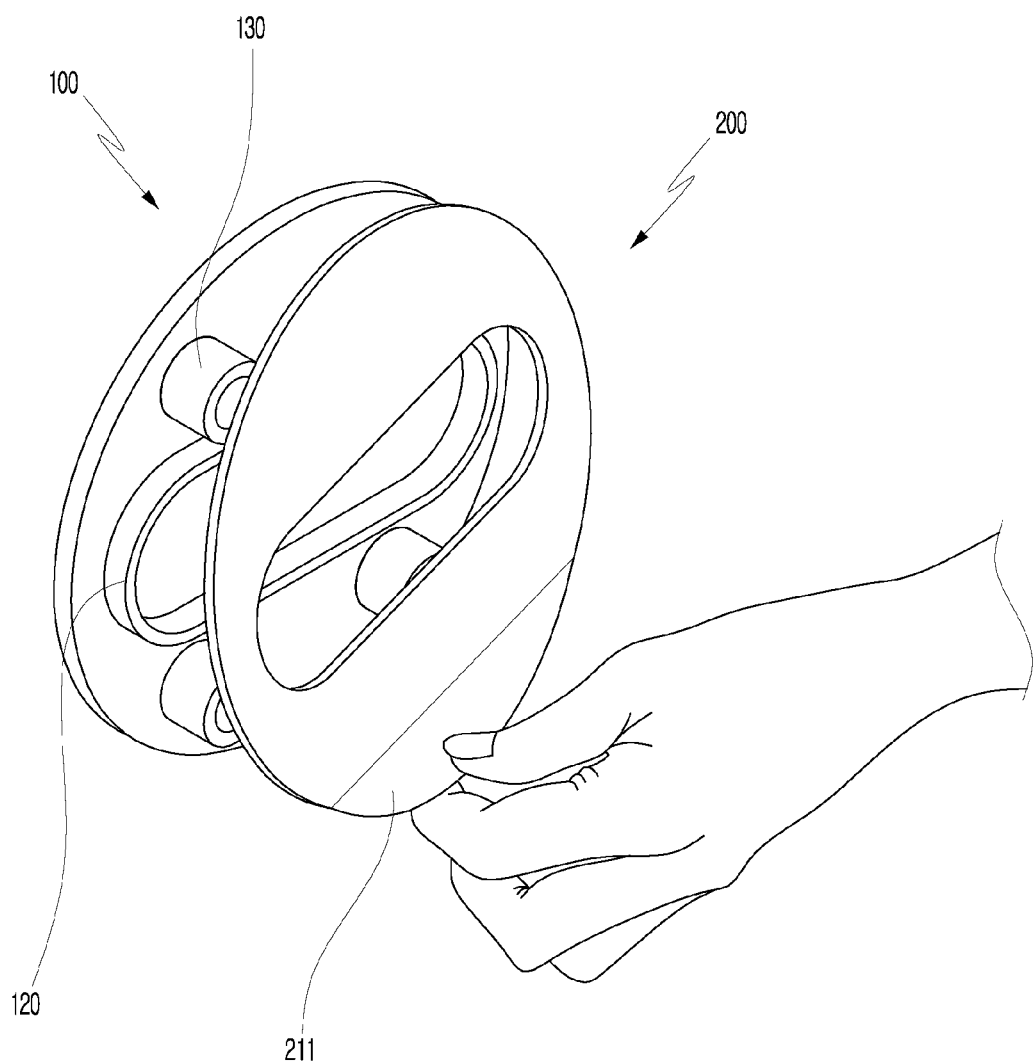
FIG. 7 is a use state view of a case in which the strap guide according to the embodiment of the present disclosure is separated.

FIG. 2 is a perspective view of the second module 200 according to the embodiment of the present disclosure, FIGS. 4A and 4B are a front view and a side view of the second module 200 of the present disclosure, respectively, and FIG. 7 is a use state view of a case in which the strap guide 300 is separated.

Referring to FIGS. 2 and 4, the second module 200 includes a second base 210, a second slot 50b, and at least one coupling protrusion 230. The second base 210 may have a thin plate shape having a circular shape, a polygonal shape, or the like. Preferably, the second base 210 may have a shape corresponding to that of the first base 110.

According to the embodiment, the second base 210 includes a bent portion 211 having an inclination angle and inclined toward the outside in one side thereof, and the second slot 50b configured to allow the strap S to pass through in a center portion thereof.

Referring to FIG. 7, the bent portion 211 may serve as a handle configured to allow the coupled strap guide 300 to be easily separable. Further, the bent portion 211 may be formed at one side of the second base 210 without limitation of a particular location in the second base 210. However, preferably, the bent portion 211 may be formed in a lower portion of the second base 210 so that the strap guide 300 may be easily separated from the pail pack 500. The inclination angle of the bent portion 211 is appropriate when it is an angle which allows fingers to easily enter between the first module 100 and the second module 200 to separate the coupled strap guide 300 and allows a force for separating the strap guide 300 to be smoothly transferred, and the inclination angle of the bent portion 211 may preferably be 10° to 20°.

The coupling protrusion 230 may be located at an outer circumferential portion of the second slot 50b to be spaced apart from the second slot at a predetermined interval, and forms a pair with the protrusion accommodation part 130 of the first module 100 when coupled to the protrusion accommodation part 130. The number of coupling protrusions 230 may be one or more and the number of coupling protrusions 230 may be determined according to the number of protrusion accommodation parts 130.

According to the embodiment, two pairs of coupling protrusions 230 may be formed above and below the second slot 50b located at the center portion at predetermined intervals. A shape of the coupling protrusion 230 may be formed in a shape corresponding to that of the bore 131 of the protrusion accommodation part 130. Preferably, the coupling protrusion 230 may have a cylindrical shape which may be easily coupled and separated, and a corner portion of a cylinder may have a gentle round shape.

Figure 5A:
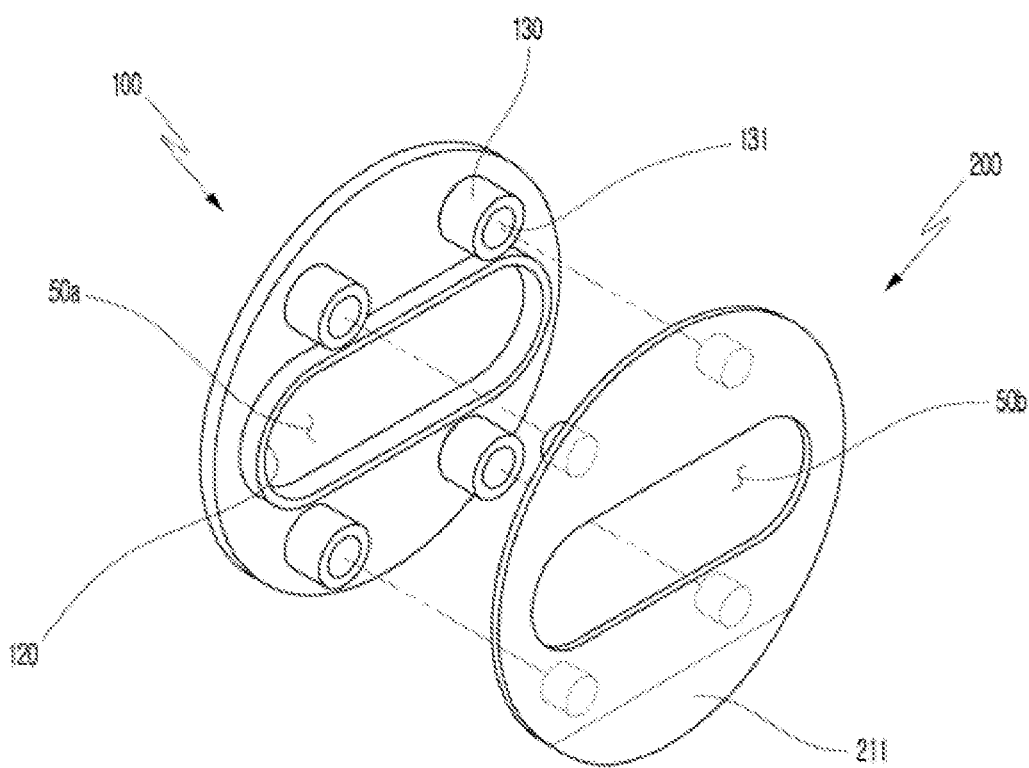
FIGS. 5A and 5B are a perspective view of a state before the first module and the second module according to the embodiment of the present disclosure are coupled and a perspective view of a state after the first module and the second module according to the embodiment of the present disclosure are coupled, respectively.
Figure 5B:
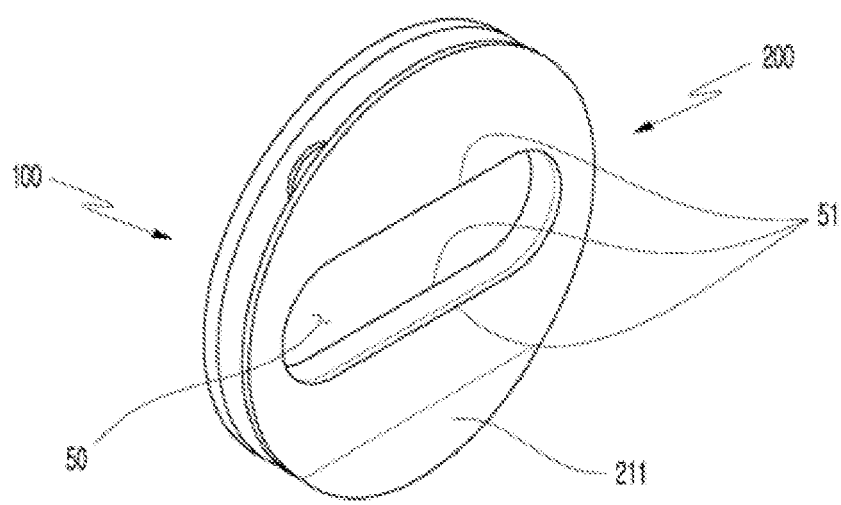
Figure 6:
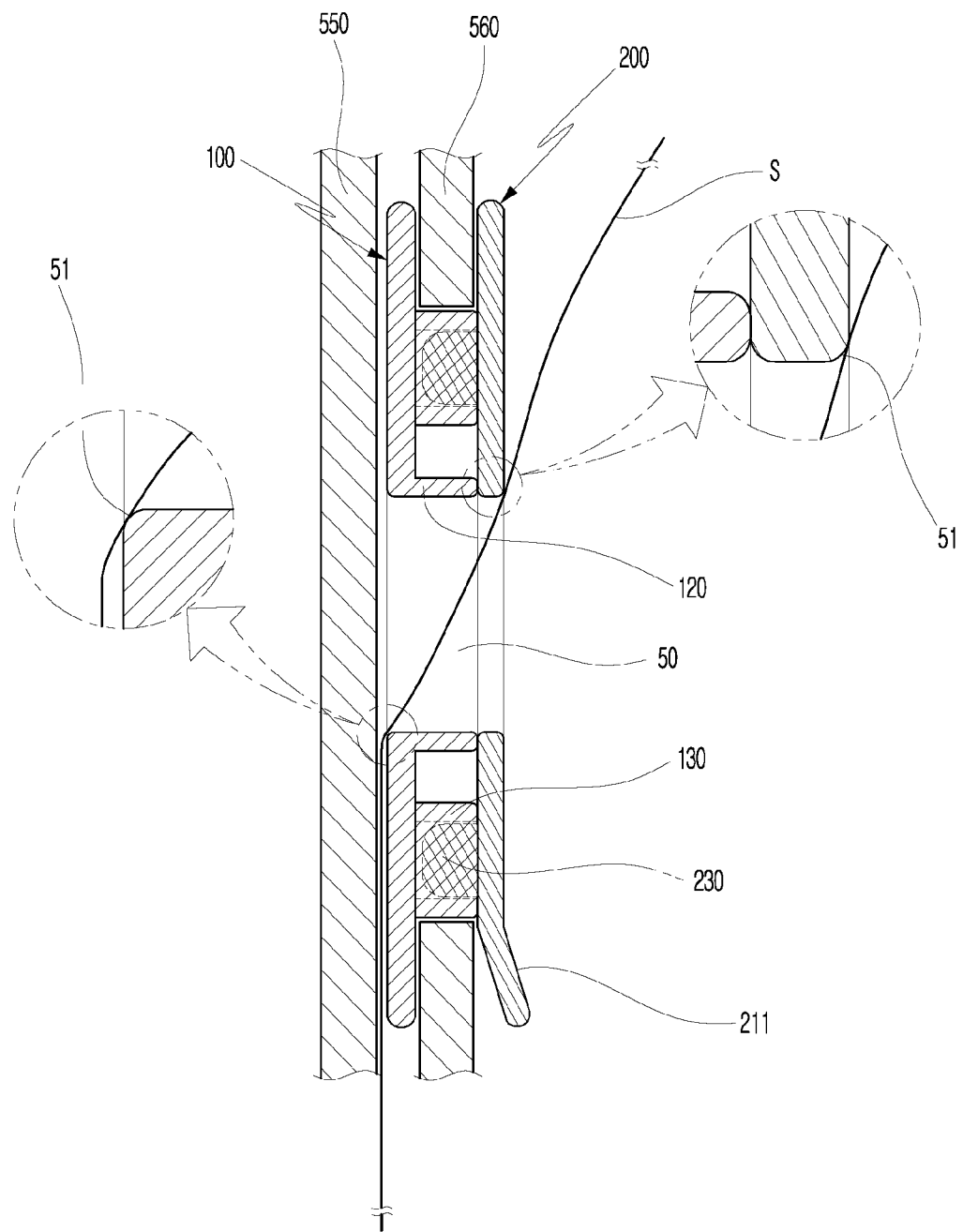
FIG. 6 shows a cutaway view of a strap guide coupled to a pail pack according to the embodiment of the present disclosure and a partial enlarged view of an opening edge.

FIGS. 5A and 5B are a perspective view of a state before the first module 100 and the second module 200 according to the embodiment of the present disclosure are coupled and a perspective view of a state after the first module 100 and the second module 200 according to the embodiment of the present disclosure are coupled, respectively, and FIG. 6 shows a cutaway view of the strap guide 300 coupled to the pail pack 500 according to the embodiment of the present disclosure and a partial enlarged view of an opening edge 51.

Referring to FIGS. 5A, 5B and 6, the coupling protrusion 230 of the second module 200 located at a location corresponding to that of the protrusion accommodation part 130 may be coupled to the protrusion accommodation part 130 of the first module 100, and a diameter of the coupling protrusion 230 may be formed to have a positive tolerance with respect to a diameter of the bore 131 for strong coupling. Further, since the bore 131 and the coupling protrusion 230 are fit-coupled to each other, shapes thereof may correspond to each other.

Continuing to refer to FIGS. 5A, 5B and 6, since the first module 100 and the second module 200 are coupled to each other, an outer surface of the first base 110, an inner circumferential surface of the strap boss 120, and an outer surface of the second base 210 are connected, and an opening 50 having a single closed surface may be formed.

When a process of moving and storing the pail pack 500 using the strap S is repeated over and over, a paper tube of the pail pack 500 may become weak to external actions, and when the opening 50 having the single closed surface is formed, since various external actions may be blocked, durability of the pail pack 500 may be improved.

Further, the strap S may pass through the opening 50 and may be supported by an edge 51 of the opening 50.

According to the embodiment, the edge 51 of the opening 50 which comes into contact with the strap S may have a gentle round shape to improve a supporting force of the strap S. In this case, since an area in which the strap S and the edge 51 of the opening 50 come into contact with each other increases, the strap S may be more solidly and safely supported.

Figure 8A:
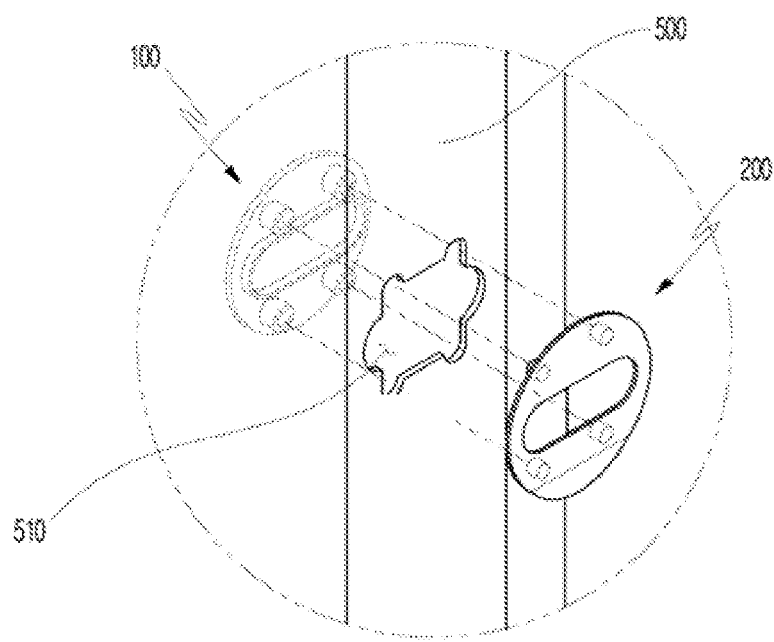
FIGS. 8A and 8B are a perspective view of an accommodation space part of the pail pack according to the embodiment of the present disclosure and a perspective view of the accommodation space part to which the strap guide is coupled, respectively.
Figure 8B:
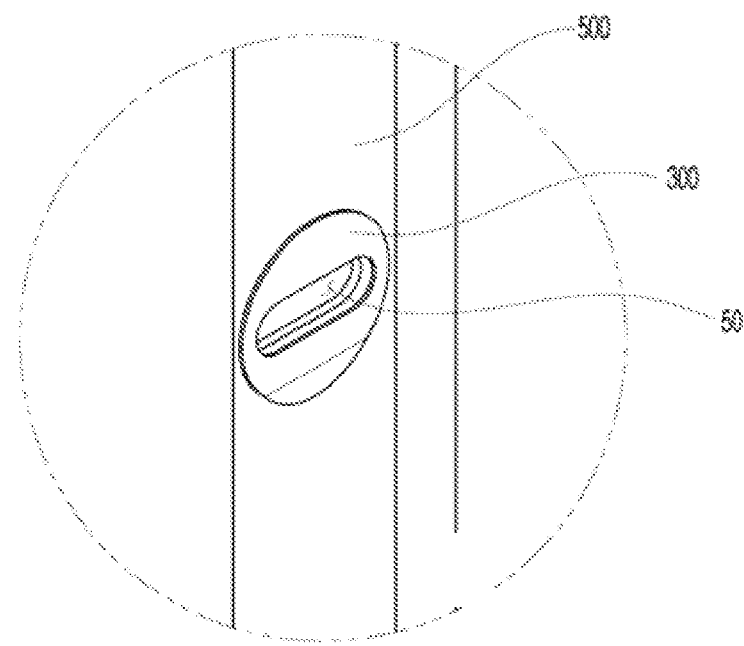
Figure 9:
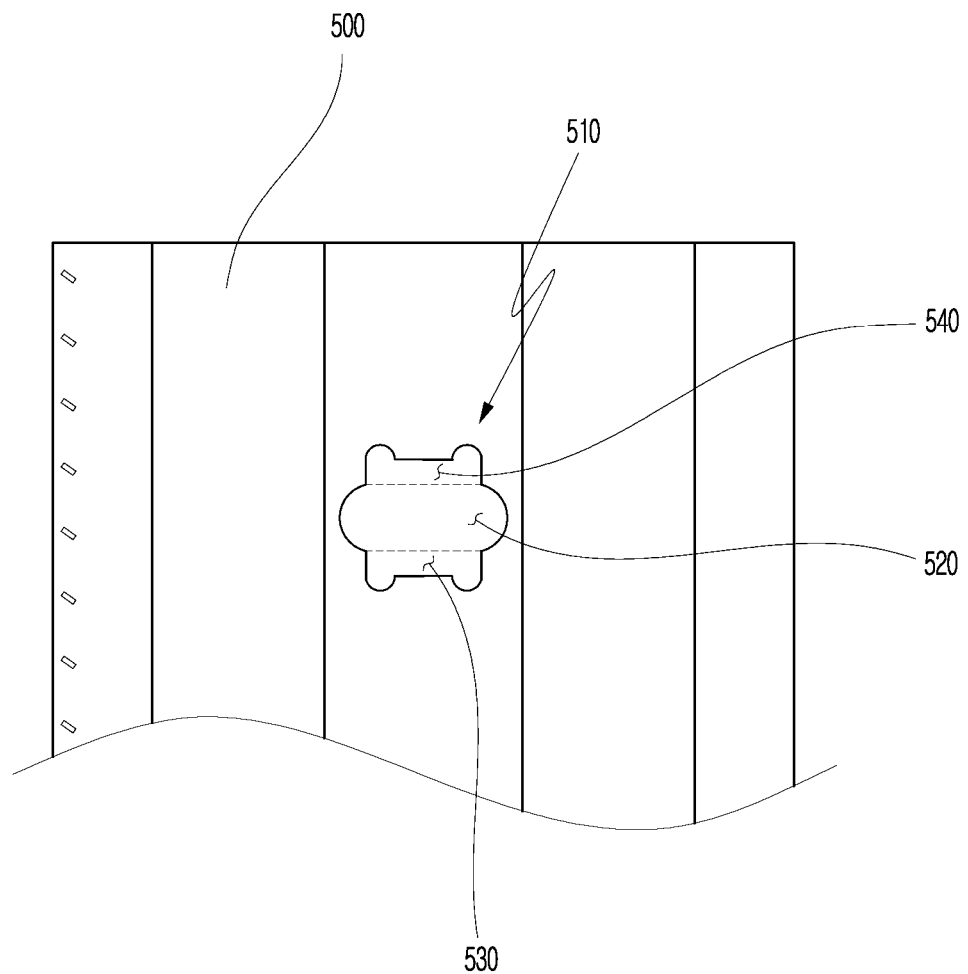
FIG. 9 is a front view of the accommodation space part of the pail pack according to the embodiment.

FIGS. 8A and 8B are a perspective view of the accommodation space part 510 of the pail pack 500 according to the embodiment of the present disclosure and a perspective view of the accommodation space part 510 to which the strap guide 300 is coupled, respectively, and FIG. 9 is a front view of the accommodation space part 510 of the pail pack 500 according to the embodiment.

Referring to FIGS. 8A, 8B, and 9, the pail pack 500 may include at least two accommodation space parts 510 configured to accommodate at least two strap guides 300.

According to the embodiment, the accommodation space part 510 may include a center space part 520 into which the strap boss 120 is fitted, and an upper space part 540 and a lower space part 530 into which the protrusion accommodation parts 130 are fitted, and the strap guide 300 may be fitted into the accommodation space part 510. The center space part 520 may be formed according to the shape of the strap boss 120, and the upper space part 540 and the lower space part 530 may be formed according to shapes of the protrusion accommodation part 130. As described above, when the strap guide 300 is coupled to the accommodation space part 510 in a fitting manner, the strap guide 300 and the pail pack 500 are engaged without shaking and do not rotate in a coupled state, and thus are stable. A shape in which the protrusion accommodation parts 130 are fitted into the upper space part 540 and the lower space part 530 may be changed according to the number of protrusion accommodation parts 130.

Referring to FIGS. 6 and 8, a width of the strap boss 120 may be greater than or equal to a thickness of the paper tube of the pail pack 500 to protect the tube of the pail pack 500 having a paper tube. In this case, since the paper tube of the pail pack 500 does not exceed the width of the strap boss 120 and is located between the first module 100 and the second module 200 in a state in which the first module 100 and the second module 200 are securely coupled and thus may be protected from an external influence, the durability of the paper tube of the pail pack 500 may be improved.

According to the embodiment, the pail pack 500 may be formed in a double-layer structure having an inner paper tube 550 and an outer paper tube 560 for enhancing strength. In this case, the pail pack 500 may be a pail pack 500 in which the first module 100 is disposed between the inner paper tube 550 and the outer paper tube 560 of the pail pack 500 and the second module 200 passes through the accommodation space part formed in the outer paper tube from the outer side of the outer paper tube 560 of the pail pack 500 to be coupled to the first module 100.

Further, the strap S enters the pail pack 500 through the opening 50 of the strap guide 300, and exits to the outside through an opening 50 of a strap guide 300 coupled to another accommodation space part 510 of the pail pack 500 by passing through a bottom part through a gap between the inner paper tube 550 and the outer paper tube 560.

Accordingly, the pail pack 300 may be efficiently lifted and moved using the strap S in addition to stably protecting the opening and the paper tube of the pail pack 300.

According to an aspect of the present disclosure, since a first module and a second module are coupled to a pail pack to form an opening of a strap guide having a single closed surface, an opening and a paper tube of pail pack can be safely protected from external actions.

Further, since the opening of the strap guide is processed to be gently round, the strap can be more solidly and safely supported.

In addition, due to the second module including a bent portion having an inclination angle and inclined toward the outside, the strap guide in a coupled state can be easily separated by hand.

In addition, the pail pack having an accommodation space part into which the strap guide can be fitted is stable because the strap guide does not rotate and can be engaged without shaking when being lifted or moved.

Effects of the present disclosure are not limited to the above-described effects and should be understood to include all effects inferable from the detailed description of the present disclosure or configurations of the present disclosure disclosed in the claims.

The above description of the present disclosure is exemplary, and it may be understood by those skilled in the art that the present disclosure may be easily modified into other specific forms without changing the technical spirit or essential characteristics. Accordingly, the above-described embodiment should be understood to be wholly exemplary and not limited. For example, elements described as a single type may be implemented to be divided, and elements described as being divided may be implemented as a coupled type.

The scope of the present disclosure is shown by the claims which will be described below, and all modifications and modified forms derived from the meanings and the scope of the claims and the equivalents should be included in the scope of the present disclosure.

What is claimed is:

1. A strap guide through which a strap is configured to pass, the strap guide comprising:
    a first module including a first base having a circular shape, a strap boss protruded from the first base and including a first slot surrounded by an inner circumferential surface of the strap boss, and at least one protrusion accommodation part located at an outer circumferential portion of the strap boss and including a bore; and
    a second module having a second base having a circular shape corresponding to that of the first base, a second slot formed in the second base and having a shape corresponding to that of the first slot, at least one coupling protrusion located at an outer circumferential portion of the second slot and configured to couple with the at least one protrusion accommodation part, wherein the first module and the second module are configured to be coupled to form an opening having a single closed surface by a combination of the first slot and the second slot, and wherein the second base includes a planar portion including the second slot and a bent portion adjacent to an edge of the second base and apart from the second slot, the bent portion being inclined in a direction opposite to a protruding direction of the at least one coupling protrusion from a line defined between the second slot and the edge of the second base to be positioned farthest at the edge of the second base from the planar portion in a direction perpendicular to the planar portion, and the at least one coupling protrusion is located only on the planar portion.

2. The strap guide of claim 1, wherein an edge of the opening has a gentle round shape.

3. The strap guide of claim 1, wherein a diameter of the coupling protrusion is formed to have a positive tolerance with respect to a diameter of the bore.

4. The strap guide of claim 1, wherein the strap boss includes curved portions having a curved shape on both side portions and straight portions formed in a direction connecting the curved portions.

5. A pail pack comprising two or more accommodation space parts each configured to accommodate the strap guide according to claim 1, wherein the each accommodation space part includes a center space part into which the strap boss is configured to be fitted, and an upper space part and a lower space part into which the protrusion accommodation part is configured to be fitted, and wherein the center space part, the upper space part and the lower space part form a single hole.

6. The pail pack of claim 5, wherein a width of the strap boss is greater than or equal to a thickness of a paper tube of the pail pack.

7. The pail pack of claim 5, wherein:

the first module is configured to be disposed between an inner paper tube and an outer paper tube of the pail pack; and the second module is configured to pass through the accommodation space part formed in the outer paper tube from an outer side of the outer paper tube to be coupled to the first module.

* * * * *